Feb. 20, 1923.
J. F. O'CONNOR
HAND BRAKE
Filed Apr. 3, 1919
1,446,203
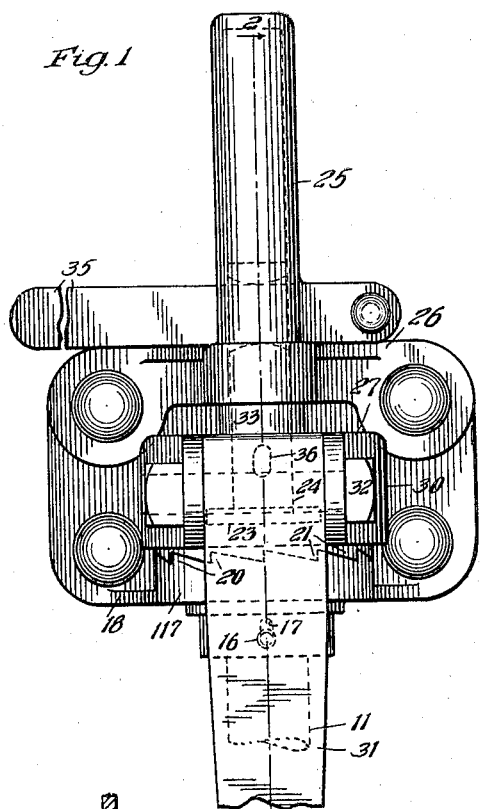
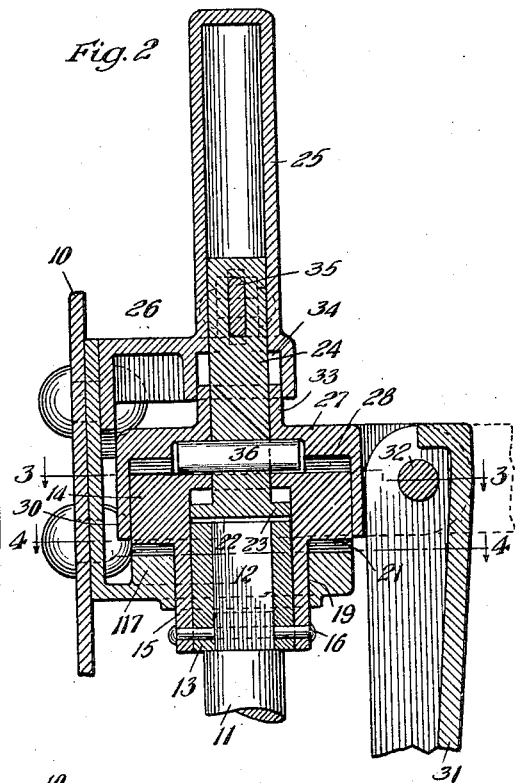
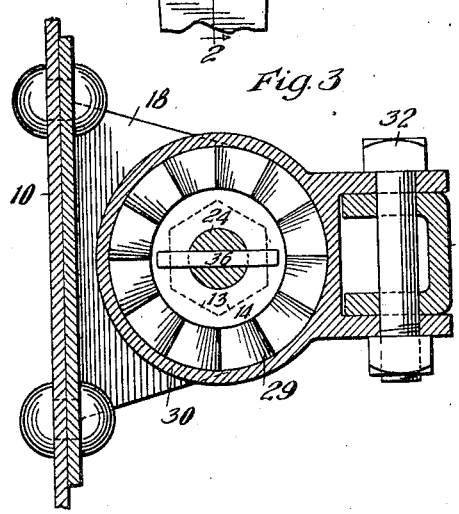
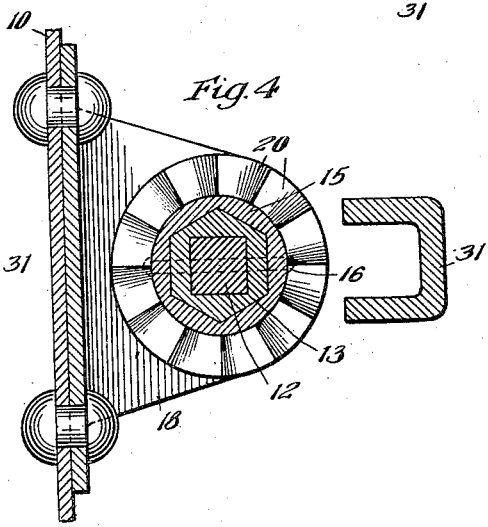
WITNESSES:
Wm. Geiger
INVENTOR.
John F. O'Connor
BY George J. Haight
his ATTORNEY Patented Feb. 20, 1923.

1,446,203

UNITED STATES PATENT OFFICE.

JOHN F. O'CONNOR, OF CHICAGO, ILLINOIS, ASSIGNOR TO WILLIAM H. MINER, OF CHAZY, NEW YORK.

HAND BRAKE.

Application filed April 3, 1919. Serial No. 287,175.

*To all whom it may concern:*

Be it known that I, JOHN F. O'CONNOR, a citizen of the United States, residing at Chicago, in the county of Cook and State of Illinois, have invented a certain new and useful Improvement in Hand Brakes, of which the following is a full, clear, concise, and exact description, reference being had to the accompanying drawings, forming a part of this specification.

This invention relates to improvements in hand brakes.

The object of the invention is to provide an efficient hand brake for freight or passenger cars wherein the chain tightening operation is effected by a ratcheting mechanism.

In the drawing forming a part of this specification, Figure 1 is an elevational view of a brake showing my improvements in connection therewith, parts being broken away in order to prevent crowding of the drawing. Fig. 2 is a vertical, sectional view taken substantially on the line 2—2 of Fig. 1. And Figs. 3 and 4 are horizontal, sectional views taken on the lines 3—3 and 4—4, respectively, of Fig. 2.

In said drawing, 10 indicates a wall of a car to which the mounting for my improved brake is attached. The brake is shown as employed with a vertical brake staff 11 having a squared or other non-circular section 12 at its upper end. Mounted on the squared section 12 is a sleeve 13 having preferably an outer surface of hexagonal cross section. Mounted on the sleeve 13 is a ratchet wheel 14 having a depending sleeve 15 fitting the exterior of the sleeve 13. The two sleeves 13 and 15 are attached to the staff 11 so as to prevent accidental removal therefrom by means of a pin 16 which passes through a vertically elongated slot 17 in the staff, the slot 17 permitting a vertical movement of the sleeves 13 and 15 for the purpose hereinafter described.

The exterior of the sleeve 15 is circular in form and is adapted to act as a journal for the upper end of the staff 11, the bearing therefor being provided by a boss 117 carried by a bracket 18 which is secured to the wall 10. As will be understood, the boss 117 is provided with a suitable bearing surface 19 for the sleeve 15. On its upper face, the boss 117 is provided with a series of ratchet teeth indicated at 20. Cooperable with the ratchet teeth 20 which are obviously fixed, are teeth 21 on the under face of the ratchet wheel 14. The teeth 20 and 21 are so arranged as to prevent rotation of the staff 11 in a counterclockwise direction as viewed in Figs. 3 and 4, in other words, to prevent release of the staff after the chain has been tightened thereon.

As will be noted from an inspection of Fig. 2, the ratchet wheel 14 is recessed above the top of the staff as indicated at 22, said recess providing a circular bearing for an annular flange 23 formed on the lower end of a vertically extending stem or plunger 24 which passes up through the top of the ratchet wheel 14 into a hollow handle 25 carried by another bracket member 26 which is also secured to the wall 10. The stem 24 is of circular cross section and forms a bearing for an oscillating pawl element 27. The pawl element 27 has preferably a plurality of radially extending teeth 28 on its interior which cooperate with a corresponding set of ratchet teeth 29 formed on the upper face of the ratchet wheel 14. The pawl member 27 is preferably provided with a depending annular flange 30 telescoped over the ratchet wheel 14 and forming a suitable housing to prevent dirt or other foreign matter getting in between the teeth 28 and 29.

To effect the oscillation of the pawl member 27, I provide a handle 31 pivoted to said pawl member as by a bolt 32, the bolt 32 extending horizontally so that the handle 31 will fall to a depending vertical inoperative position under the influence of gravity. As will be understood, the handle 31 is elevated to a horizontal position when the ratcheting is to be effected. The pawl member 27 has an upstanding circular flange 33 which fits within a corresponding recess 34 formed in the lower end of the handle 25, the arrangement being such that the pawl member 27 may be elevated or additionally telescoped within the recess 34 as will be evident from an inspection of Fig. 2. As will be understood, the teeth 28 and 29 are arranged in the opposite direction to that of the teeth 20 and 21.

To tighten the brake chain, the operator lifts the handle 31 to its horizontal position and oscillates or pulls the same toward himself so as to rotate the staff in a clockwise direction. During this movement the teeth 28 and 29 will lock and positively rotate the ratchet wheel 14 which in turn will cause rotation of the staff 11. During this action the teeth 21 of the ratchet wheel will slip over the teeth 20 of the fixed ratchet. At the end of the stroke, reverse rotation of the staff is prevented due to the locking engagement of the teeth 20 and 21 and the brakeman then swings the handle 31 in a counterclockwise direction during which movement the teeth 28 will slip over the teeth 29. This operation is repeated until the desired tension is placed upon the brake chain.

To effect release of the staff, I employ the following arrangement: Pivotally attached to the upper bracket 26 is a lever 35 which extends through suitable slots in the hollow handle 25 and in the stem 24. The normal position of the lever 35 is as indicated in Figs. 1 and 2, that is, when the stem 24 is in its lowermost position. When the brakeman desires to release the staff, the lever 35 is lifted which in turn will lift the stem 24. Carried by the stem 24 is a transversely extending key 36 which engages the pawl member 27 as shown in Fig. 2. Consequently, as the stem 24 is elevated, the pawl member 27 will be lifted out of engagement with the ratchet teeth 29. Continued elevation of the stem 24 will result in the flange 23 at the lower end thereof engaging the ratchet wheel 14 and ultimately the latter will be lifted so as to disengage the teeth 21 thereof from the teeth 20 of the fixed ratchet, whereupon the ratchet wheel 14 and staff are free to rotate in a reverse direction. It will be noted that in effecting the release, the teeth 28 and 29 are first disengaged, the object of this being to insure that the operating handle 31 is entirely free and cannot be suddenly thrown around so as to strike and injure the brakeman. The parts will, of course, fall back into their operative condition under the influence of gravity, upon release of the lever 35.

I claim:

1. In a hand brake, the combination with a brake staff, of a wheel rotatable in unison therewith, said wheel having two sets of ratchet teeth; and an immovable ratchet wheel cooperable with one of said sets of ratchet teeth, another ratchet wheel oscillatable with respect to the staff and cooperable with the other of said sets of ratchet teeth, means for oscillating the last named ratchet wheel, and means for disengaging said ratchet wheels and sets of ratchet-teeth to permit release of the staff.

2. In a hand brake, the combination with a brake staff, or a pair of cooperating ratchet wheels, one of which is held against movement in all directions and the other rotatable in unison with the staff and together adapted to lock the staff against rotation in an unwinding direction, a second pair of cooperating ratcheting elements, one of which is rotatable in unison with the staff and the other oscillatable with respect thereto, means for manually oscillating said last named element to effect rotation of said staff in a direction to wind the chain, and devices separate from said ratchet wheels, for rendering inoperative said ratchet wheels and said ratchet.

3. In a hand brake, the combination with a brake staff, of a pair of cooperating ratchet wheels, one of which is immovably fixed, and the other rotatable in unison with the staff and together adapted to lock the staff against rotation in an unwinding direction, a second pair of cooperating ratcheting elements, one of which is rotatable in unison with the staff and the other oscillatable with respect thereto, means for manually oscillating said last named element to effect rotation of said staff in a direction to wind the chain, and devices separate from said ratchet wheels first rendering inoperative the elements of the second mentioned pair of cooperating ratchet elements and thereafter the first mentioned pair of ratchet wheels, said devices being manually operable and entirely separate from said means.

4. In a brake for railway cars and the like; the combination with a vertical brake staff; of a ratchet wheel rotatable therewith; means for locking said staff against rotation in an unwinding direction, said means and said ratchet wheel being relatively movable toward and away from each other to effect the locking and unlocking of said staff; a pawl member oscillatable with respect to said staff and cooperable with said ratchet wheel to effect rotation of the staff in a chain-winding direction; a handle for effecting oscillation of said pawl member; a device movable relative to said means for disengaging the pawl from the ratchet wheel; a second device also movable relative to said means for disengaging the ratchet wheel and locking means; and operating means so connected to both of said devices as to render the said devices operatively effective in sequence.

5. In a hand brake of the character described, the combination with a vertical brake staff, of a ratchet wheel slidably mounted on said staff but rotatable in unison therewith, said ratchet wheel having a set of ratchet teeth on its upper face and also a set of ratchet teeth on its under face, a fixed ratchet cooperable with the ratchet teeth on the under face of said ratchet wheel, a pawl member oscillatable with respect to the staff and cooperable with the ratchet teeth on the upper face of said ratchet wheel, a gravity drop handle for effecting oscillation of said pawl member, and a vertically movable releasing stem, said stem having shouldered engagement with the pawl member and the ratchet wheel and adapted to elevate the same until the ratchet teeth on the under face of the ratchet wheel are disengaged from the fixed ratchet.

6. In a hand brake of the character described, the combination with a vertical brake staff, of a bracket adapted to be secured to a wall, a ratchet wheel rotatable in unison with said staff but slidable vertically with respect thereto, said ratchet wheel having a set of ratchet teeth on its upper face and another set of ratchet teeth on its under face, ratchet teeth carried by said bracket and adapted to cooperate with the ratchet teeth on the under face of the ratchet wheel to lock the latter and the staff against rotation in an unwinding direction, a pawl member oscillatable with respect to the staff and cooperable with the ratchet teeth on the upper face of the ratchet wheel, means for oscillating said pawl member, a stem in alinement with the staff, means for elevating said stem, and cooperating sets of shoulders on the stem and pawl member and on the stem and ratchet wheel, the first mentioned set of cooperating shoulders being normally in engagement and the second named set of shoulders being normally separated whereby, upon elevation of said stem, the pawl member is first disengaged from the ratchet wheel and thereafter the ratchet wheel is disengaged from the fixed ratchet teeth carried by the bracket.

7. In a hand brake, the combination with a brake staff; of a wheel rotatable in unison therewith, said wheel having a set of ratchet teeth on its upper face and a set of ratchet teeth on its under-face; a relatively fixed ratchet wheel cooperable with one of said sets of ratchet teeth; another ratchet wheel oscillatable with respect to the staff and cooperable with the other of said sets of ratchet teeth; means oscillating the last named ratchet wheel, and means for disengaging all of said ratchet wheels and sets of ratchet teeth to permit release of the staff.

8. In a brake, the combination with a brake staff; of a pair of cooperating ratchet wheels, one of which is immovably fixed and the other rotatable in unison with the staff and together adapted to lock the staff against rotation in an unwinding direction, a second pair of co-operating ratchet elements, one of which is rotatable in unison with the staff and the other oscillatable with respect thereto; means for manually oscillating said last named element to effect rotation of said staff in a direction to wind the chain; and simultaneously operated interconnected devices sequentially effective for first rendering inoperative the elements of the second mentioned pair of co-operating ratchet elements and thereafter the first mentioned pair of ratchet wheels, said devices being manually operable and entirely separate from said means.

9. In a brake for railway cars and the like; the combination with a vertical brake staff; of a ratchet wheel rotatable therewith; means for locking said staff against rotation in an unwinding direction, said means and said ratchet wheel being relatively movable toward and from each other to effect the locking and unlocking of said staff; a pawl member oscillatable with respect to said staff and cooperable with said ratchet wheel to effect rotation of the staff in a chain winding direction; a handle for effecting oscillation of said pawl member; and means for successively rendering inoperative said pawl member and locking means comprising a pair of devices, both movable relative to said means, and mechanism directly operating each of said devices to render effective first one of said devices to disengage said pawl from the ratchet wheel and to render effective thereafter the other of said devices to disengage said ratchet wheel and locking means.

10. In a brake for railway cars and the like; the combination with a vertical brake staff; of relatively movable ratchet and ratchet locking elements, one of said elements having an abutment member thereon, said ratchet element being rotatable with said staff and said locking element normally retaining said staff against rotation in an unwinding direction; a pawl member oscillatable with reference to said staff and cooperable with said ratchet wheel to effect rotation of said staff in a chain winding direction, said pawl member having an abutment face thereon arranged in spaced relation to said abutment member; a handle for effecting oscillation of said pawl member; and movable means carrying devices adapted to engage with said pawl member and said abutment, said devices being spaced apart a distance greater than the space between said abutment face and said abutment member, when the pawl and locking devices are operative, whereby, when said movable member is operated, the pawl and locking means are rendered successively inoperative.

In witness that I claim the foregoing I have hereunto subscribed my name this 29th day of March, 1919.

JOHN F. O'CONNOR.